US012597533B2

(12) United States Patent
Kwon

(10) Patent No.: US 12,597,533 B2
(45) Date of Patent: Apr. 7, 2026

(54) METHOD FOR PRODUCING INSULATING COMPOSITE MATERIAL FOR SILICONE RUBBER SOCKET AND METHOD FOR MANUFACTURING SILICONE RUBBER SOCKET INCLUDING SAME

(71) Applicant: Pukyong National University Industry-University Cooperation Foundation, Busan (KR)

(72) Inventor: Hansang Kwon, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 253 days.

(21) Appl. No.: 18/479,614

(22) Filed: Oct. 2, 2023

(65) Prior Publication Data

US 2024/0161941 A1 May 16, 2024

(30) Foreign Application Priority Data

Oct. 25, 2022 (KR) ........................ 10-2022-0138492

(51) Int. Cl.
*H01B 3/46* (2006.01)
*H01B 3/10* (2006.01)
*H01B 3/12* (2006.01)

(52) U.S. Cl.
CPC ............... *H01B 3/465* (2013.01); *H01B 3/10* (2013.01); *H01B 3/12* (2013.01)

(58) Field of Classification Search
CPC . H01B 3/46; H01B 3/465; H01B 3/10; H01B 3/12
USPC ..................................................... 174/137 B
See application file for complete search history.

(56) References Cited

U.S. PATENT DOCUMENTS

2023/0171878 A1* 6/2023 Takinishi .......... B29C 45/14811 174/255

FOREIGN PATENT DOCUMENTS

| | | | |
|---|---|---|---|
| KR | 101515584 B1 | | 5/2015 |
| KR | 10-2016-0113492 A | | 9/2016 |
| WO | WO 2018/131486 | * | 7/2018 |

* cited by examiner

*Primary Examiner* — Tremesha W Burns
(74) *Attorney, Agent, or Firm* — Harness, Dickey & Pierce, P.L.C.

(57) ABSTRACT

Proposed is a method for producing an insulating composite material for a silicone rubber socket, in which the method includes a step of producing a molded body of a mixture of liquid silicone and a heterogeneous composite powder composited from (i) metal powder and (ii) polymer or ceramic powder. An insulating composite material for a silicone rubber socket, produced by the method, is also proposed. Further proposed is a silicone rubber socket manufacturing method including the steps of producing a sheet-shaped molded body from a mixture including liquid silicone and a heterogeneous composite powder composited from (i) a metal powder and (ii) a polymer or ceramic powder and (b) forming a plurality of pores extending through the sheet-shaped molded body in a thickness direction and filling the pores with a conductive material. In addition, a silicone rubber socket manufactured by the method is also proposed.

5 Claims, 1 Drawing Sheet

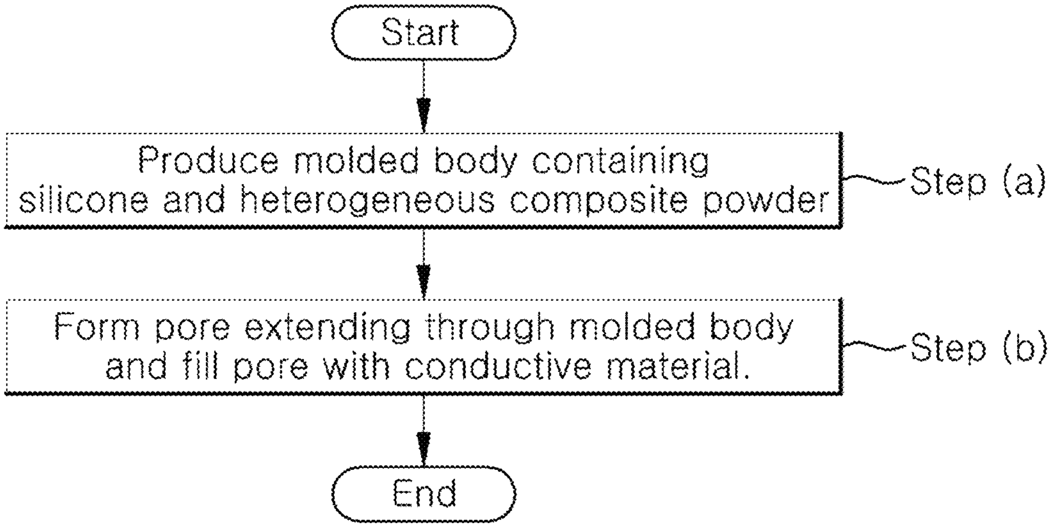
Start
Produce molded body containing silicone and heterogeneous composite powder
Step (a)
Form pore extending through molded body and fill pore with conductive material.
Step (b)
End

METHOD FOR PRODUCING INSULATING COMPOSITE MATERIAL FOR SILICONE RUBBER SOCKET AND METHOD FOR MANUFACTURING SILICONE RUBBER SOCKET INCLUDING SAME

CROSS REFERENCE TO RELATED APPLICATION

The present application claims priority to Korean Patent Application No. 10-2022-0138492, filed Oct. 25, 2022, the entire contents of which is incorporated herein for all purposes by this reference.

BACKGROUND OF THE INVENTION

1. Field of the Invention

The present disclosure relates to a method for producing a composite material that can be used as a material for an insulating portion of a silicone rubber socket for testing semiconductor devices and a method for manufacturing a silicone rubber socket using the composite material.

2. Description of the Related Art

In general, integrated circuit (IC) chips undergo an electrical characteristics test and a burn-in test to check whether the products are defective before the shipment thereof. The electrical characteristics test is a test for determining electrical characteristics such as input/output characteristics, pulse characteristics, processing performance characteristics, and noise tolerance of the IC chips by connecting all the input/output terminals of each IC chip to an external circuit that generates predetermined testing signals. The burn-in test is a test for checking whether a defect occurs for a certain period by applying a voltage higher than a rated voltage at a temperature higher than a normal operating environment to the IC chips that have passed the electrical characteristics test.

For the electrical characteristics test or burn-in test, test sockets are used. For example, in the case of using a pogo pin socket, conductive pins are directly brought into contact with the terminals of a semiconductor device. In addition, there is a silicone rubber socket formed such that a silicone rubber body is filled with gold-coated metal particles.

In recent years, the terminal pitch of semiconductor devices has been reduced. Therefore, the socket testing method is preferred over the pin testing method. However, using sockets made of silicone rubber cause problems that semiconductor devices are vulnerable to static electricity and deformation of powder particles in the silicone rubber or sagging of the silicone rubber occurs due to repeated use of the sockets.

Documents of Related Art

Patent Document (Patent Document 1) Korean Patent Application Publication No. 10-2016-0113492 (published as of Sep. 29, 2016)

(Patent Document 2) Korean Patent No. 10-1515584 (registered as of Apr. 21, 2015)

SUMMARY OF THE INVENTION

One objective of the present disclosure is to provide a method for producing an insulating composite material for a silicone rubber socket, the composite material having excellent mechanical properties and antistatic properties thereby being capable of preventing malfunction of test equipment or defect of semiconductor devices tested by static electricity. Another objective is to provide an insulating composite material produced by the method. A further objective is to provide a method of manufacturing a silicone rubber socket including the insulating composite material. A yet further objective is to provide a silicone rubber socket manufactured by the method.

In a first aspect of the present disclosure, there is provided a method for producing an insulating composite material for a silicone rubber socket, the method including: producing a molded body from a mixture including liquid silicone and a heterogeneous composite powder composited from (i) a metal powder and (ii) a polymer or ceramic powder.

In the method, the metal may be at least one metal or an alloy of two or more metals selected from the group consisting of Al, Mg, Cu, Ti, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

In the method, the polymer may be (i) a thermoplastic resin selected from the group consisting of an acrylic resin, an olefin resin, a vinyl resin, a styrene resin, a fluorine resin, and a fibrinogen resin, or (ii) a thermosetting resin selected from the group consisting of an epoxy resin and a polyimide resin.

In the method, the ceramic may be (i) an oxide-based ceramic or (ii) a non-oxide-based ceramic selected from nitride, carbide, boride, and silicide.

In the method, the mixture may further include a compound represented by the following Formula 1 to improve the antistatic performance of the molded body.

Formula 1

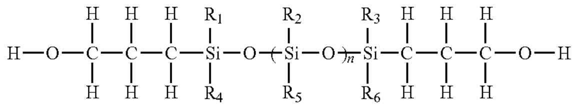

In Formula 1, $R_1$ to $R_6$ are each independently an alkyl group having 1 to 6 carbon atoms and n is an integer in a range of from 5 to 30.

In a second aspect of the present disclosure, there is provided an insulating composite material for a silicone rubber socket manufactured by the method described above.

In a third aspect of the present disclosure, there is provided a method for a silicone rubber socket, the method including: producing a sheet-shaped molded body from an insulating composite material for a silicone rubber socket, the method including: (a) producing a molded body from a mixture including liquid silicone and a heterogeneous composite powder composited from (i) a metal powder and (ii) a polymer or ceramic powder; (b) forming a plurality of pores extending through the sheet-shaped molded body in a thickness direction and filling the pores with a conductive material. In addition, there is further provided a silicone rubber socket manufactured by the method.

When producing a composite material for a silicone rubber socket for testing semiconductor devices using the production method of the present disclosure, it is possible to control the mechanical properties, thermal conductivity, surface resistance, etc. of the composite material by varying the mixing ratio of the liquid silicone and the heterogeneous composite powder, thereby enabling the production of customized silicone rubber sockets satisfying desired specifications.

The silicon rubber socket manufactured by the manufacturing method of one aspect of the present disclosure has better mechanical properties than conventional silicon rubber sockets, so that the reliability of semiconductor test measurements can be increased. In addition, the silicone rubber socket manufactured by the manufacturing method of one aspect of the present disclosure has improved durability due to excellent heat dissipation and anti-static property, thereby providing cost reduction effect.

BRIEF DESCRIPTION OF THE DRAWINGS

FIG. 1 is a process flowchart illustrating a method for producing a composite material for a silicone rubber socket according to the present disclosure.

DESCRIPTION OF THE PREFERRED EMBODIMENTS

In describing the disclosures, well-known functions or constructions will not be described in detail when it is determined that they may obscure the gist of the present disclosure.

Since embodiments in accordance with the concept of the disclosure can undergo various changes and have various forms, only some specific embodiments are illustrated in the drawings and described in detail in the present specification. While specific embodiments of the present disclosure are described herein below, they are only for illustrative purposes and should not be construed as limiting to the present disclosure. Therefore, the present disclosure should be construed to cover not only the specific embodiments but also cover all modifications, equivalents, and substitutions that fall within the concept and technical spirit of the present disclosure.

The terminology used herein is for the purpose of describing embodiments only and is not intended to limit the scope of the present disclosure. As used herein, the singular forms "a", "an", and "the" are intended to include the plural forms as well unless the context clearly indicates otherwise. It will be further understood that the terms "comprise" or "has" when used in the present specification specify the presence of stated features, regions, integers, steps, operations, elements and/or components, but do not preclude the presence or addition of one or more other features, regions, integers, steps, operations, elements, components and/or combinations thereof.

Hereinafter, the present disclosure will be described in detail.

The present disclosure relates to a method for producing a composite material that can be used as a material for an insulating portion serving as an insulating layer disposed between each of a plurality of conductive portions in contact with terminals of a semiconductor device in a silicone rubber socket. The method includes the steps of producing a sheet-shaped molded body by shaping and curing a mixture obtained by mixing liquid silicone resin and heterogeneous composite powder into a sheet shape, in which the heterogeneous composite powder is a composite of (i) metal powder and (ii) polymer or ceramic powder.

The mixture includes 5 to 30 parts by weight of the heterogeneous composite powder based on 100 parts by weight of the liquid silicone, thereby maximizing mechanical properties and antistatic properties of the molded article made of the mixture.

The heterogeneous mixed powder may include 15% to 45% by volume of the metal powder and 55% to 85% by volume of the polymer or ceramic powder.

The heterogeneous composite powder is obtained by compounding metal powder and polymer or ceramic powder through various types of ball milling processes such as electric ball milling, agitation ball milling, and planetary ball milling. For example, a low-energy milling process using a conventional electric ball mill may be performed at 100 to 500 rpm for 1 to 24 hours to obtain the heterogeneous composite powder.

The metal of the metal powder is any one metal or a metal alloy of two or more metals selected from the group consisting of Al, Cu, Ti, Mg, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

In addition, the polymer powder may be made of a thermoplastic resin or a thermosetting resin.

Examples of the thermoplastic resin include: olefin resins such as polyethylene, polypropylene, and poly-4-methylpentene-1; acrylic resins such as polymethyl methacrylate and acrylonitrile; vinyl resins such as polyvinyl chloride, polyvinyl acetate, polyvinyl alcohol, polyvinyl butyral, polyvinyldenum chloride; styrene-based resins such as polystyrene and ABS resin; fluorine resins such as tetrafluoride ethylene resin, trifluoride ethylene resin, polyvinyl fluoride, and polyvinyl fluoride; and cellulose resins such as nitrocellulose, cerolose acetate, ethyl cellulose, and propylene cellulose. Aside from these examples, polyamide, polyamideimide, polyacetal, polycarbonate, polyethylene butarate, polybutylene butarate, ionomo resin, polysulfone, polyethersulfone, polyphenylene ether, polyphenylene sulfide, polyetherimide, poly ether ether ketone, aromatic polyester (econol, polyarylate), etc. can also be used.

In addition, examples of the thermosetting resin include a phenol resin, an epoxy resin, and a polyimide resin.

In addition, the ceramic powder may be made of an electrically insulative oxide-based ceramic or non-oxide-based ceramic.

Examples of the oxide in the oxide-based ceramic include $Al_2O_3$, $SiO_2$, $TiO_2$, $Y_2O_3$, $ZrO_2$, $Ta_2O_5$, $ThO_2$, $ZrSiO_2$, BeO, $CeO_2$, $Cr_2O_3$, $HfO_2$, $La_2O_3$, MgO, and $Nb_2O_3$.

The non-oxide-based ceramic may be selected from nitrides, carbides, and silicides. The nitrides may include at least one of AlN, GaN, InN, BN, $Be_3N_2$, $Cr_2N$, HfN, MoN, NbN, $Si_3N_4$, TaN, $Ta_2N$, $Th_2N_3$, TiN, $WN_2$, $W_2N$, VN, and ZrN. The carbides may include at least one of $B_4C$, $Cr_3C_2$, HfC, $LaC_2$, $Mo_2C$, $Nb_2C$, SiC, $Ta_2C$, $ThC_3$, TiC, $W_2C$, WC, $V_2C$, and ZrC. The silicides may include at least one of $CrSi_2$, $Cr_2Si$, HfSi, $MoSi_2$, $NbSi_2$, $TaSi_2$, $Ta_5Si_3$, $ThSi_2$, $Ti_5Si_3$, $WSi_2$, $W_5Si_3$, $V_3Si$, and $ZrSi_2$.

Furthermore, in order to more increase the electrical properties of the molded body of the composite material, the mixture may further include at least one type of additive selected from a compound represented by any one of the following Formulas 1 to 3, lithium hexafluoroarsenate, lithium hexafluoroantimonate, lithium trifluoromethanesulfonate, lithium tetrafluoroborate, lithium perchlorate, and lithium hexafluorophosphate.

<Formula 1>

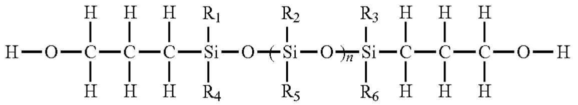

In Formula 1, $R_1$ to $R_6$ are each independently an alkyl group having 1 to 6 carbon atoms and n is an integer in a range of from 5 to 30.

The compound represented by Formula 1 has repeating ionic and nonionic moieties, a high content of ionic functional groups, excellent antistatic effect, and excellent compatibility with the liquid silicone resin in the mixture.

Preferably, in the compound represented by Formula 1, all of $R_1$ to $R_6$ are methyl groups ($—CH_3$), and n may be 20.

<Formula 2>

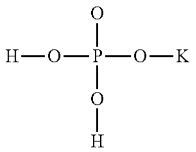

<Formula 3>

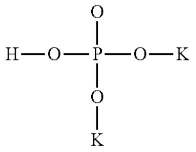

On the other hand, the content of the additives in the mixture is preferably 0.1 to 10 parts by weight based on 100 parts by weight of the liquid silicone resin. This is because when the content is less than 0.1 parts by weight, a sufficient antistatic effect cannot be exhibited, and when the exceeds 10 parts by weight, the liquid silicone resin has poor physical properties.

In addition, in order to adjust the physical properties and viscosity of the liquid silicone resin, auxiliary ingredients such as silicone oil, a curing rate regulator, a curing agent, and a filler may be additionally added to the mixture, and the content of the auxiliary ingredients in the mixture may be 0.1 to 7 parts by weight based on 100 parts by weight of the liquid silicone resin.

As the silicone oil, any silicone oil commonly used in the art may be used. For example, dimethyl polysiloxane, methyl phenyl polysiloxane, methyl hydrogen polysiloxane, etc. may be used. Alternatively, modified silicone oils formed by introducing various functional groups into the exemplary silicone oils, such as epoxy-modified silicone oil, alkyl-modified silicone oil, amine-modified silicone oil, carboxyl-modified silicone oil, alcohol-modified silicone oil, fluorine-modified silicone oil, alkyl or aralkyl polyether-modified silicone oil, epoxy polyether-modified silicone oil. etc. may be used. In addition, as the curing rate regulator, any curing rate regulator commonly used in the art may be used. For example, chloroplatinic acid, alcohol compounds of chloroplatinic acid, aldehyde compounds of chloroplatinic acid, salts of chloroplatinic acid and olefin ring compounds, etc. may be used. In addition, any silicone curing agent widely used in the art may be used as the curing agent. For example, organic hydrogen polysiloxane may be used.

A silicone rubber socket includes an insulating portion composed of the composite material for a silicone rubber socket produced by the above-described method and a plurality of conductive portions to come into contact with terminals of a semiconductor device, and the silicone rubber socket is manufactured by a silicone rubber socket manufacturing method including the steps of: (a) producing a sheet-shaped molded body from a mixture of liquid silicone and heterogeneous composite powder composited from (i) metal powder and (ii) polymer or ceramic powder; (b) forming a plurality of pores extending through the sheet-shaped molded body in a thickness direction of the molded body and filling the pores with a conductive material.

Since the step (a) has been described when describing the composite material production method for a silicone rubber socket, a redundant description will not be given.

In the step (b), in order to form the conductive portion of the silicone rubber socket, the pores passing through the sheet-shaped molded body made of the insulating composite material in the thickness direction are formed through a perforation method such as laser or mechanical processing, and each of the pores is filled with a conductive material.

In this case, the conductive material filling the pores to form the conductive portions may be made of one type of metal or an alloy thereof selected from Au, Ag, Cu, Fe, Zn, Cr, Ni, Co, Al, etc. Preferred examples of the conductive material include nickel (Ni) powder coated with gold (Au), nickel-cobalt alloy (Ni—Co) powder, and the like.

Hereinafter, the present disclosure will be described in more detail by way of examples.

Examples disclosed in the present disclosure can be modified into various other forms, and the scope of the present disclosure is not construed as being limited to the examples described below. Examples are provided to more fully describe the present disclosure to the ordinarily skilled in the art.

EXAMPLE

Aluminum-magnesium mixed composite powder was prepared by homogeneously mixing pure aluminum (Al) powder having a particle size of 50 μm or less and pure magnesium (Mg) powder having a particle size of 50 μm or less through a low-energy mechanical milling process (150 rpm, 24 h). Next, alumina ($Al_2O_3$) powder and magnesia (MgO) powder mixed at a volume ratio of 1:1 were added in different amounts according to the surface resistance of the composite material to be manufactured, and stirred for homogeneous mixing. Next, liquid silicone was added, and the mixture was dispersed and mixed with a stirrer (300 rpm, 1 h), injected into a predetermined mold, and cured to prepare an insulating composite material for a silicone rubber socket.

While exemplary embodiments of the present disclosure have been described with reference to the accompanying drawings, those skilled in the art will appreciate that the present disclosure can be implemented in other different forms without departing from the technical spirit or essential characteristics of the exemplary embodiments. Therefore, it can be understood that the exemplary embodiments described above are only for illustrative purposes and are not restrictive in all aspects.

What is claimed is:

1. A method for producing an insulating composite material for a silicone rubber socket, the method comprising:

producing a molded body from a mixture including liquid silicone and a heterogeneous composite powder composited from (i) metal powder and (ii) polymer or ceramic powder, wherein the mixture further comprises a compound represented by Formula 2 or Formula 3 below:

<Formula 2>

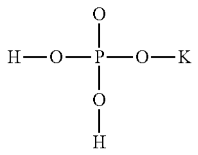

<Formula 3>

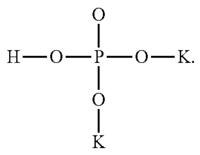

2. The method of claim 1, wherein the metal is any one metal or a metal alloy of two or more metals selected from the group consisting of Al, Mg, Cu, Ti, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

3. The method of claim 1, wherein the polymer is (i) a thermoplastic resin selected from the group consisting of an acrylic resin, an olefin resin, a vinyl resin, a styrene resin, a fluorine resin, and a fibrinogen resin, or (ii) a thermosetting resin selected from the group consisting of an epoxy resin and a polyimide resin.

4. The method of claim 1, wherein the ceramic is (i) an oxide ceramic or (ii) any one non-oxide ceramic selected from the group consisting of nitrides, carbides, borides, and silicides.

5. An insulating composite material for a silicone rubber socket, the composite material produced by the method of claim 1.

* * * * *